(12) United States Patent
Schilling et al.

(10) Patent No.: US 7,167,503 B2
(45) Date of Patent: *Jan. 23, 2007

(54) DISTRIBUTED SPREAD-SPECTRUM NETWORK

(75) Inventors: Donald L. Schilling, Palm Beach Gardens, FL (US); Joseph Garodnick, Centerville, MA (US)

(73) Assignee: Linex Technologies, Inc., West Long Branch, NJ (US)

( * ) Notice: Subject to any disclaimer, the term of this patent is extended or adjusted under 35 U.S.C. 154(b) by 132 days.

This patent is subject to a terminal disclaimer.

(21) Appl. No.: 10/298,481

(22) Filed: Nov. 18, 2002

(65) Prior Publication Data
US 2003/0091095 A1 May 15, 2003

Related U.S. Application Data

(63) Continuation of application No. 09/729,911, filed on Dec. 6, 2000, now Pat. No. 6,493,377.

(51) Int. Cl.
*H04B 1/707* (2006.01)
(52) U.S. Cl. ...................... 375/130; 375/141
(58) Field of Classification Search ............... 375/130, 375/140, 141; 370/320, 335, 342, 441, 352, 370/353, 354, 355, 356; 379/89, 112; 725/81
See application file for complete search history.

(56) References Cited

U.S. PATENT DOCUMENTS

| | | | |
|---|---|---|---|
| 4,797,882 A | 1/1989 | Maxemchuk | |
| 5,425,051 A * | 6/1995 | Mahany | ............ 375/132 |
| 5,455,865 A | 10/1995 | Perlman | |
| 5,481,532 A | 1/1996 | Hassan et al. | |
| 5,604,869 A | 2/1997 | Mincher et al. | |

(Continued)

OTHER PUBLICATIONS

PCT Notification of Transmittal of International Search Report May 12, 2001.

(Continued)

*Primary Examiner*—Don N. Vo
(74) *Attorney, Agent, or Firm*—David Newman

(57) ABSTRACT

A distributed spread-spectrum network, comprising remote stations and nodes. One or more hub node(s) connect(s) to a central telephone office. A node's spread-spectrum transceiver communicates, using packets having spread-spectrum modulation, over radio waves, with the remote stations. Each packet has a source address and a destination address, and may have other information such as a header, start of message, end of message, flow-control information, forward error correction, and message data. A store-and-forward subsystem stores and forwards one or more packets to and from the remote station. The store-and-forward subsystem stores and forwards the one or more packets to and from another node. A flow-control subsystem controls the store-and-forward subsystem, to store each packet arriving at the spread-spectrum transceiver. The flow-control subsystem communicates traffic information between each of the nodes. The flow-control subsystem routes the packet through appropriate nodes to the hub node from a remote station. Based on the traffic at each node, the flow-control subsystem transmits the packet from the hub node to an appropriate node, and routes the packet to a recipient remote station. The flow-control subsystem routes the plurality of packets through a path in the plurality of nodes to ensure that the plurality of packets arrive sequentially for voice or video packets.

32 Claims, 6 Drawing Sheets

U.S. PATENT DOCUMENTS

| | | | |
|---|---|---|---|
| 5,742,593 | A | 4/1998 | Sharony et al. |
| 5,751,792 | A | 5/1998 | Chau et al. |
| 5,859,879 | A * | 1/1999 | Bolgiano et al. ............ 370/330 |
| 6,046,978 | A | 4/2000 | Melnik |
| 6,097,703 | A | 8/2000 | Larsen et al. |
| 6,301,239 | B1 | 10/2001 | Chuprun et al. |
| 2002/0013856 | A1* | 1/2002 | Garcia-Luna-Aceves et al. ........................ 709/238 |
| 2004/0073933 | A1* | 4/2004 | Gollnick et al. ............. 725/81 |

OTHER PUBLICATIONS

PCT Written Opinion Aug. 13, 2001.

A Reliable, Efficient Topology Broadcast Protocol for Dynamic Networks, Bhargay Bellur and Richard G. Ogier, IEEE Infocom, Mar. 21-25, 1999.

Leonard Kleinrock, Static Flow Control in Store-and-Forward Computer Networks, IEEE Trans. On Computers, vol. COM-28, No. 2, Feb. 1980.

Robust Adaptive Network Protocols for Restrictive Environments, SRI International, ITAD-1648-FR-99-054, SRI Project No. 1648, for U.S. Arym Communications-Electronics Command, Fort Monmouth, NJ.

* cited by examiner

DISTRIBUTED SPREAD-SPECTRUM NETWORK

RELATED PATENTS

This patent stems from a continuation application of U.S. patent application Ser. No. 09/729,911, and filing date of Dec. 6, 2000 now U.S Pat. No. 6,493,377, entitled DISTRIBUTED NETWORK, SPREAD-SPECTRUM SYSTEM by inventor, DONALD L. SCHILLING and Joseph Garodnick. The benefit of the earlier filing date of the parent patent application is claimed for common subject matter pursuant to 35 U.S.C. § 120.

BACKGROUND OF THE INVENTION

This invention relates to spread-spectrum communications, and more particularly to a wireless distributed network for reducing power and power variations, when transmitting packets having spread-spectrum modulation.

DESCRIPTION OF THE RELEVANT ART

As the data rate increases, the power transmitted by a cellular "telephone" and by the cellular base station (BS) must also increase to ensure a low probability of error. As illustratively shown in FIG. 1, a star network, as is presently used for cellular networks, is used to communicate data between a central office 50 and a plurality of remote stations (RS). A plurality of base stations 20, 30, 40, communicate directly with the central office 50. A first base station 20 communicates data between a first plurality of remote stations 21, 22, 23, 24. A second base station 30 communicates data between a second plurality of remote stations 31, 32, 33, 34, 35, 36. A third base station 40 communicates data between a third plurality of remote stations 41, 42, 43, 44, 45.

In the star network of FIG. 1, data, in general, are not communicated directly between base stations, but through the central office 50. The routing of data is a fixed communication path, from a remote station through a base station to the central office, and vice versa. Data generally are not routed, with dynamically changing paths, between remote stations which communicate with a base station, and data are not routed between remote stations directly through base stations, without passing through the central office 50. Also, data are not routed to the central office 50, using communications paths which dynamically vary between base stations, depending upon availability.

The power transmitted by the base station and the remote stations, and the ability to properly control the power, are problems which are growing in importance with the start of third generation (3G) wireless systems, which stresses data transmission which requires low error rates and Internet access. Previously, a user could transmit data at the rate of 9.6 kilobit per second (Kb/s). Now, with 3G wireless systems, this rate is increasing to 384 kb/s and higher. For the increased data rates, the power must increase by a factor of 40 or more to ensure no degradation of performance.

A proposed solution to this problem is to install additional base stations, or towers. This is a very costly solution since some base stations will be overloaded with traffic and other base stations underutilized. This solution, however, certainly will reduce the power transmitted. Users who are distant from the base station still will be required to transmit significantly larger power than users located near the base station, to alleviate the near-far power problem. This very significant difference in distance and therefore in transmitted power, requires very accurate power control, which is a limiting feature in the current, standardized, 3G system. For example, consider acquisition: One limitation is effective packet size; that is, it takes significant time for the base station to help the user adjust its transmit power to the correct level. As more time is required, the packet will, in effect, increase in length, using time which could be allocated for data transmission or the transmission of additional data packets. This "ramp up" time could exceed the duration of the data portion of the packet itself. As another example, during power control adjustment, a user transmitting with too much power can increase the error rate of a user transmitting at the proper power level.

The present base station multi-access scheme currently in use is not a preferred system approach.

SUMMARY OF THE INVENTION

A general object of the invention is to increase capacity of data from remote stations to a central office.

Another object of the invention is to reduce power levels and power level variations required for transmitting from remote stations and from the base stations.

An additional object of the invention is a more flexible network, which dynamically adapts to changing data requirements between remote stations and a central office.

According to the present invention, as embodied and broadly described herein, a distributed network, spread-spectrum system is provided, comprising a plurality of remote stations and a plurality of nodes. The plurality of nodes forms the distributed network. The distributed network plus the plurality of remote stations form the distributed system. In the plurality of nodes, one or more nodes are hub nodes, which connect to a central telephone office. The plurality of nodes covers a geographic area. Each node covers a micro-cell having a radius, which, typically, is less than one mile. Each node includes a plurality of spread-spectrum transceivers, or, equivalently, a plurality of spread-spectrum transmitters and a plurality of spread-spectrum receivers. Each node also includes a store-and-forward subsystem, and a flow-control subsystem, at least one node transmitter, and more typically a plurality of node transmitters, and at least one node receiver and more typically a plurality of node receivers.

Transmission between the remote station and a node is through the use of CDMA modulation, although any other modulation technique may be employed. Transmitting between nodes may be by cable, fiber optic cable, or microwave link, using any of a variety of modulation techniques. Steerable antennas may be employed. Such modulation and communications channels are well-known in the art.

Each node's spread-spectrum transceiver communicates, using packets having spread-spectrum modulation, over radio waves, with a plurality of remote stations. Each packet has a source address and a destination address, and may contain other information such as flow-control information, forward error correction, and message data. The store-and-forward subsystem stores and forwards one or more packets to and/or from the remote station. The store-and-forward subsystem stores and forwards the one or more packets to and from another node in the plurality of nodes.

A node transmitter communicates with a node receiver located at a different node from the transmitting node.

The flow-control subsystem in the distributed network controls the store-and-forward subsystem, to store each packet arriving at the spread-spectrum transceiver. The flow-control subsystem communicates traffic information between each of the nodes in the plurality of nodes. The traffic information typically includes traffic density at each of the nodes and node-memory availability. Using the traffic information, and in response to a packet having the destination address to the hub node, the flow-control subsystem routes the packet through appropriate nodes to the hub node or, in the case of a "local call", to the remote user directly. A "local call" is defined as a call between remote stations located within (i.e., accessing) the same distributed network. For the local call, the central office connection is not required.

Based on the traffic at each node, and each packet having a destination address to a remote station, the flow-control subsystem transmits the packet from a central office to an appropriate hub node to an appropriate node, and routes the packet to the next recipient node. Each packet in a message may traverse a different route. In response to a plurality of packets having voice data, the flow-control subsystem routes the plurality of packets through the same path in the plurality of nodes to ensure that the plurality of packets arrive sequentially. The flow control procedure balances the activity in each node relative to other nodes in the distributed network.

When an information packet(s) arrives from a remote station, the node routes the packet(s) to an appropriate second recipient node on the way to an intended hub node and central office, toward the destination address.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
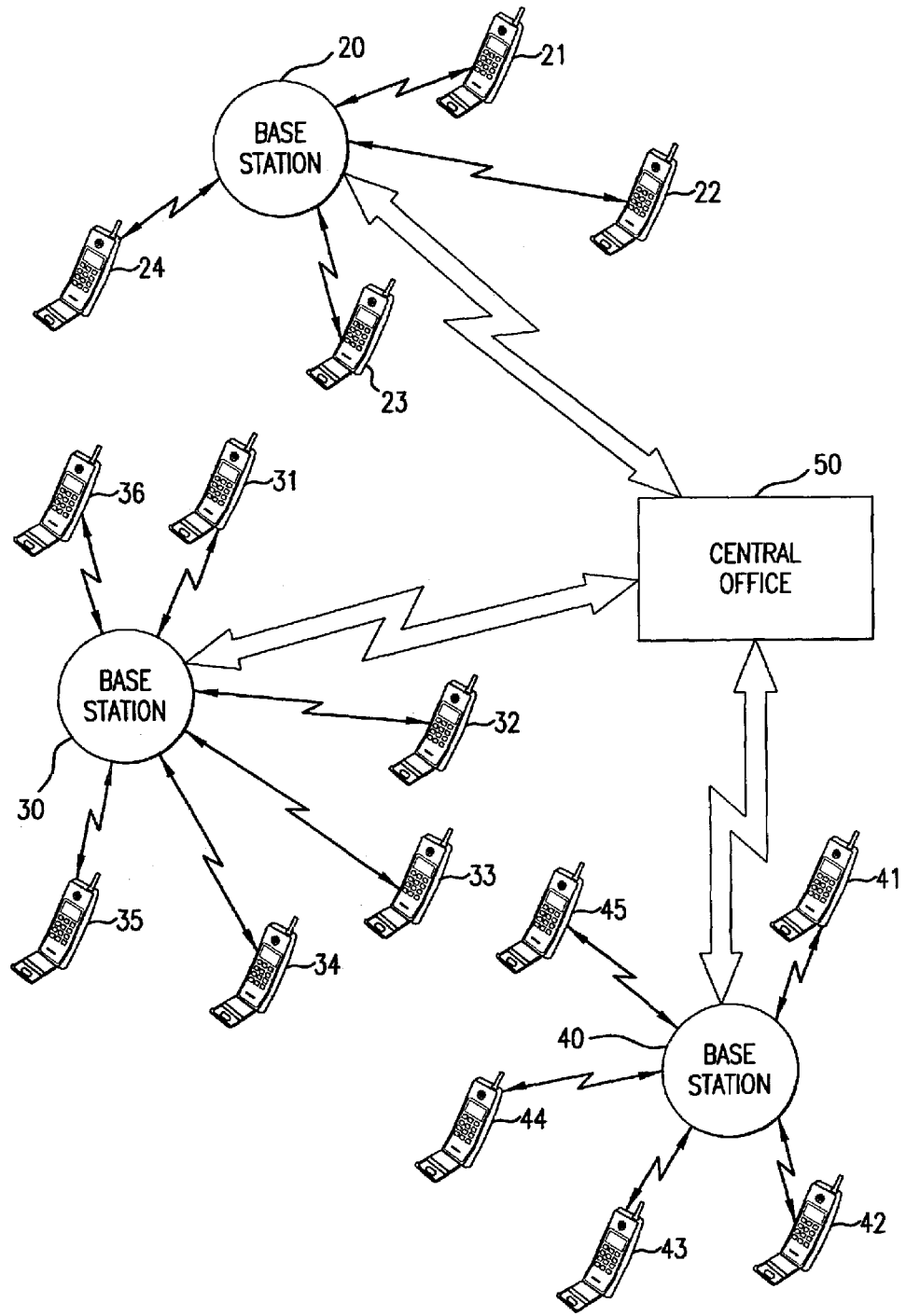
FIG. 1 is a block diagram of a current cellular spread-spectrum system, showing all base stations communicating with a central office.

Reference now is made in detail to the present preferred embodiments of the invention, examples of which are illustrated in the accompanying drawings, wherein like reference numerals indicate like elements throughout the several views.

Figure 2:
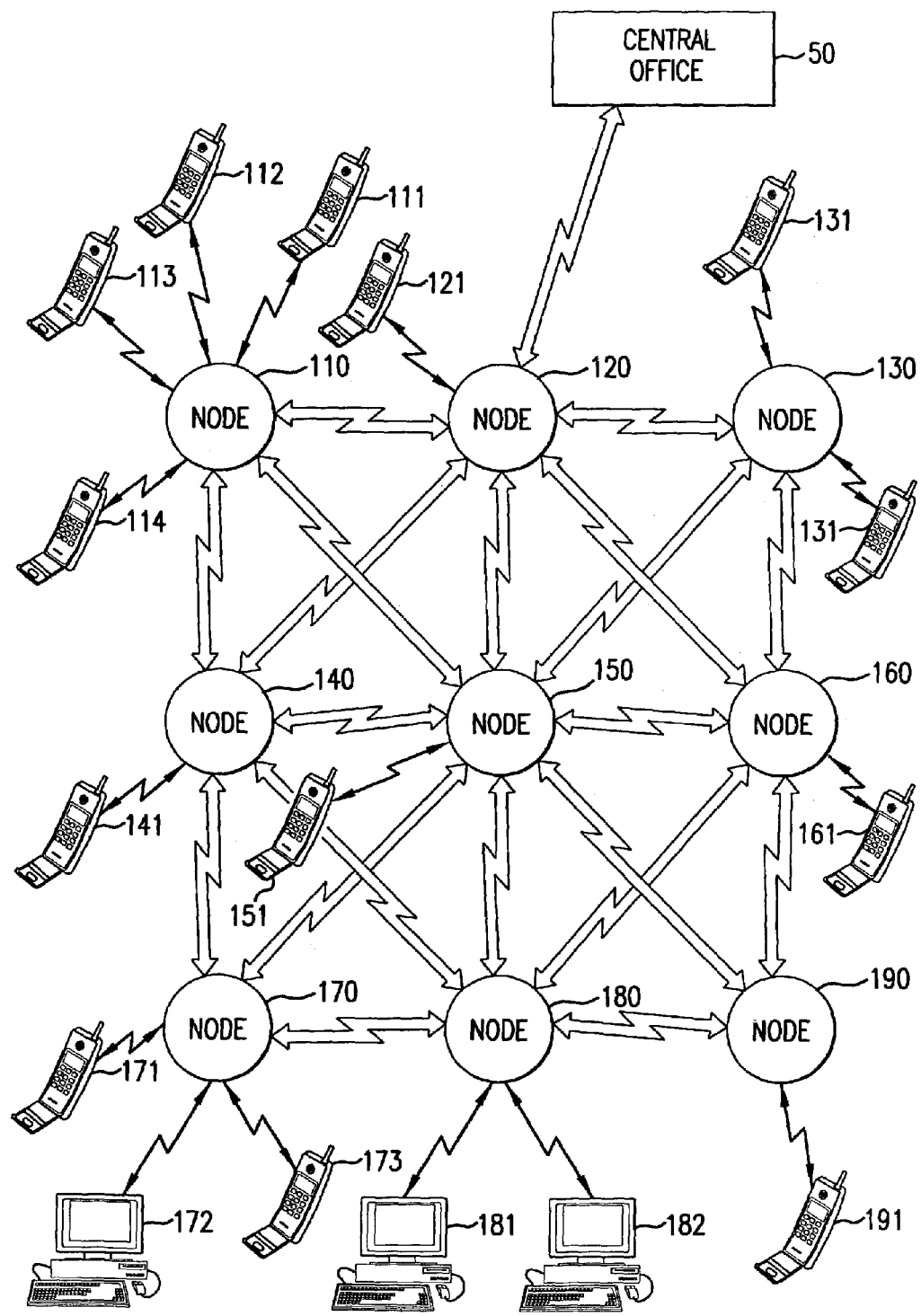
FIG. 2 is a block diagram of a distributed network, spread-spectrum system.

As illustratively shown in FIG. 2, a distributed network, spread-spectrum system is provided, comprising a plurality of remote stations and a plurality of nodes 110, 120, 130, 140, 150, 160, 170 180, 190. The plurality of nodes 110, 120, 130, 140, 150, 160, 170 180, 190 forms the distributed network. The distributed network plus the plurality of remote stations form the distributed system. The plurality of nodes 110, 120, 130, 140, 150, 160, 170 180, 190 of FIG. 2, depicts, by way of example, a first node 110, a second node, 120, a third node 130, a fourth node 140, a fifth node 150, a sixth node 160, a seventh node 170, an eighth node 180 and a ninth node 190.

Figure 3:
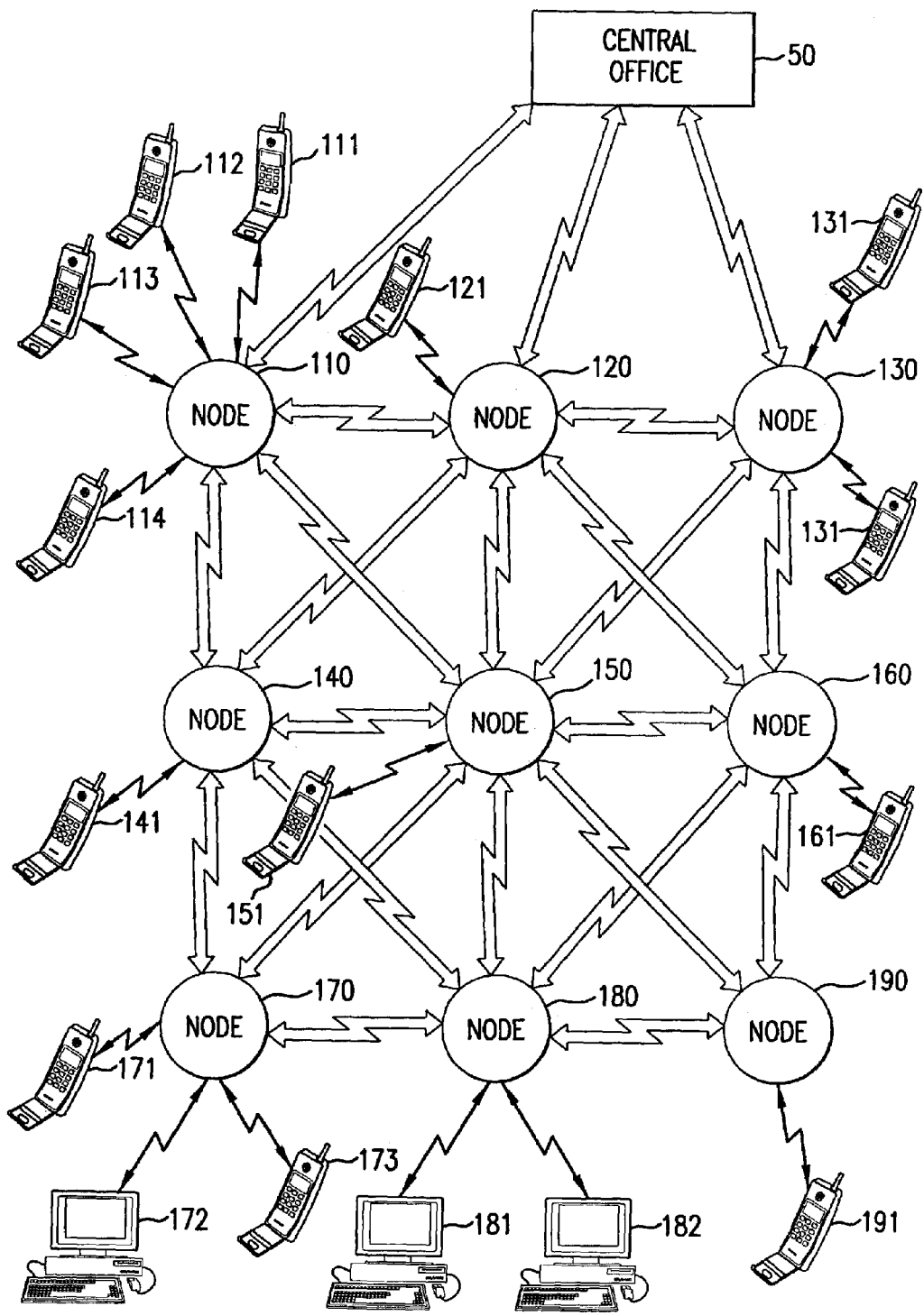
FIG. 3 is a block diagram of a distributed network, spread-spectrum system.

In the plurality of nodes 110, 120, 130, 140, 150, 160, 170 180, 190, one node, the second node 120, is a hub node, which communicates to a central telephone office 50. Thus, there may be a plurality of hubs. In an alternative embodiment, as shown in FIG. 3, a set of the plurality of nodes (hubs) communicates to the central office 50. The set of the plurality of nodes (hubs), may include the entire plurality of nodes.

The plurality of nodes 110, 120, 130, 140, 150, 160, 170 180, 190 covers a geographic area. Each node in the plurality of nodes 110, 120, 130, 140, 150, 160, 170 180, 190 covers a micro-cell having a radius much less than one mile.

Figure 4:
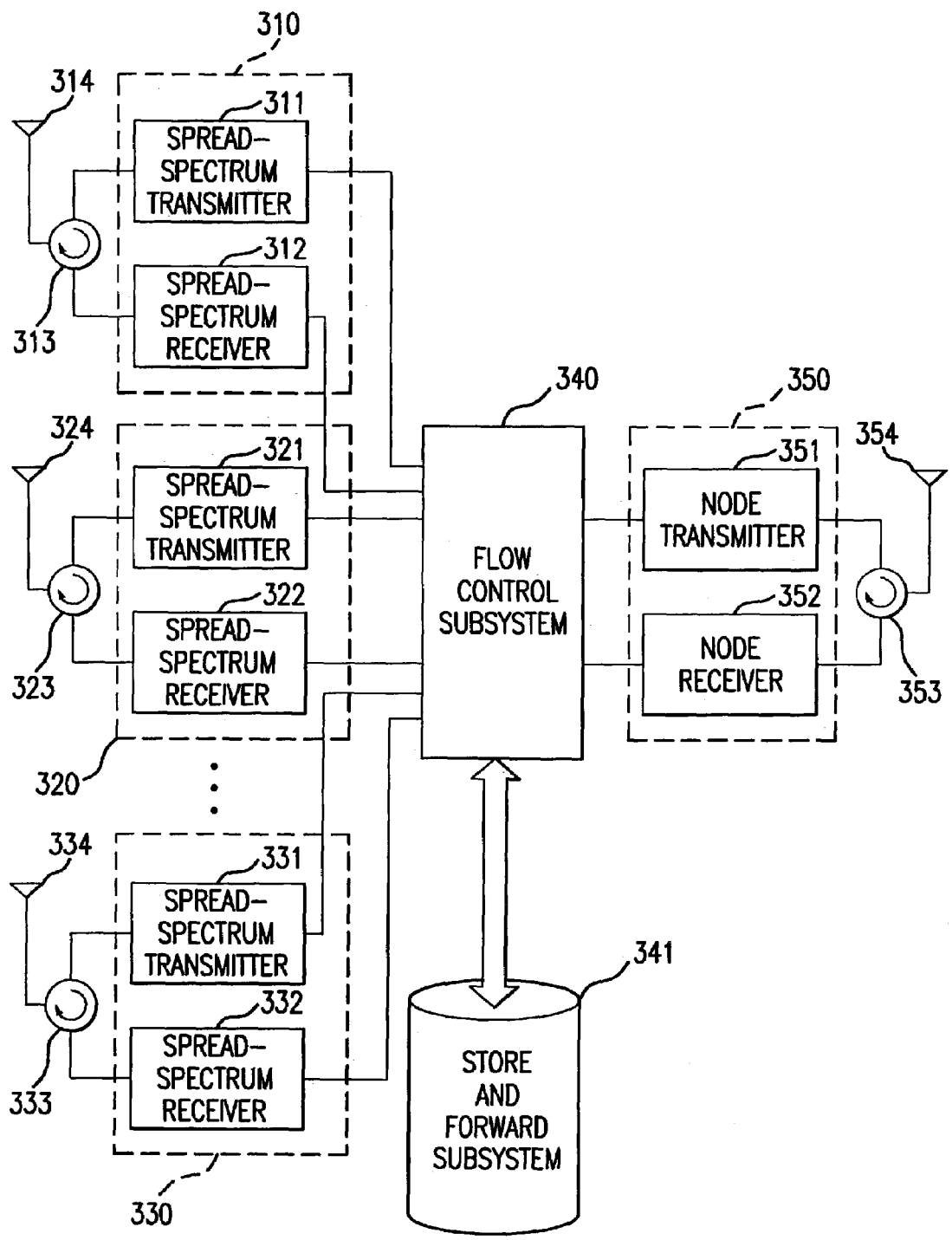
FIG. 4 is a block diagram illustrating key elements of a node with a central office communicating with a set of a plurality of nodes.
Figure 5:
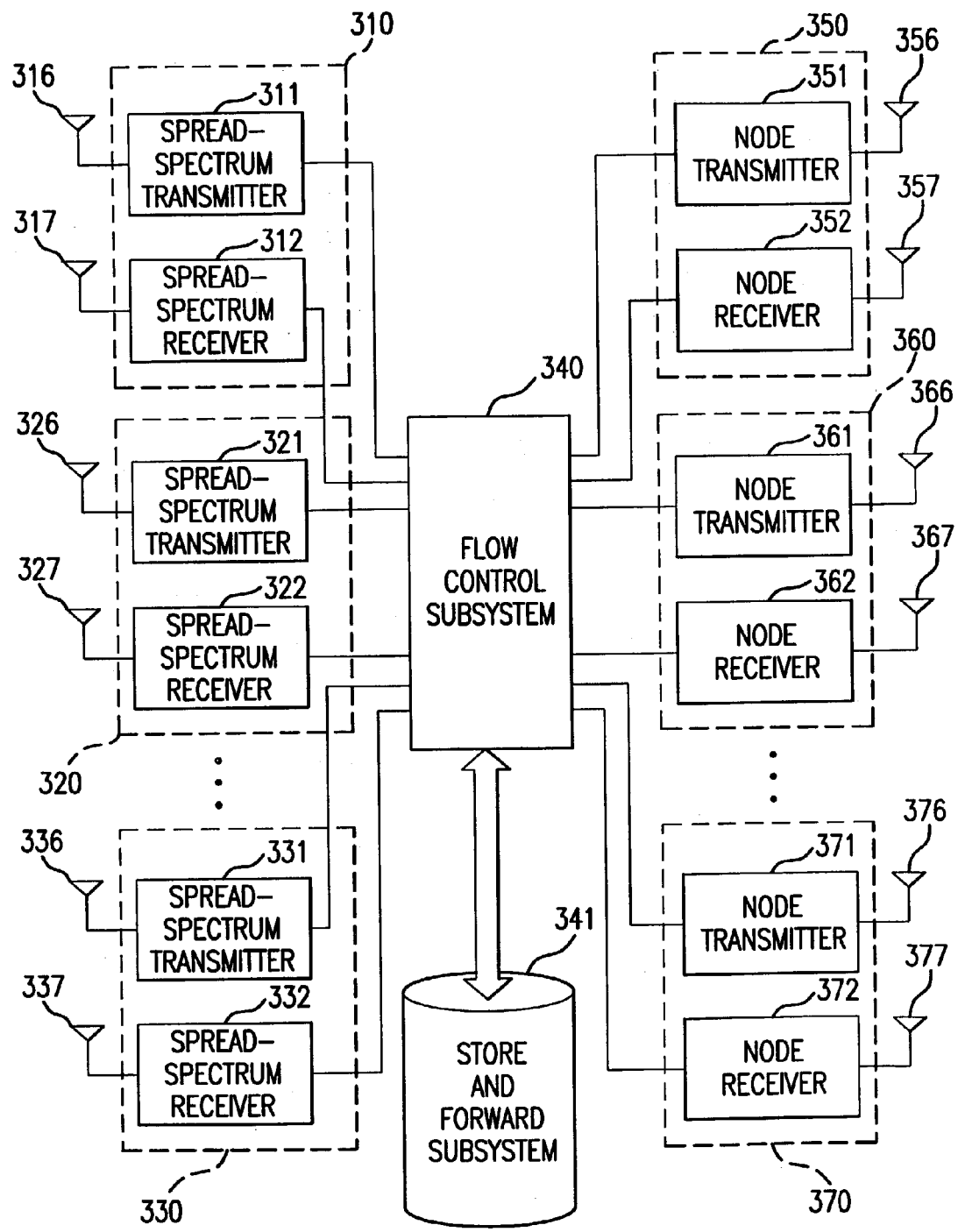
FIG. 5 is an alternative block diagram illustrating key elements of a node.

FIGS. 4 and 5 illustratively show an example of what might be at each node. For communicating between nodes, in FIG. 4, for example, there is a node transceiver 350, or equivalently, a node transmitter 351 and a node receiver 352. The node transmitter 351 and the node receiver 352 are coupled through a node isolator 353 to a node antenna 354. Transceiver 350 can be at microwave frequencies or connect to a fiber optic link or any other channel capable of handling the traffic between nodes.

FIG. 5 shows an example of a plurality of node transceivers 350, 360 and 370, or equivalently, a plurality of node transmitters 351, 361, 371 and a plurality of node receivers 352, 362, 372. In place of using a single antenna and an isolator, the first node transmitter 351 is coupled to a first node-transmitter antenna 356, and the first node receiver 352 is coupled to the first node-receiver antenna 357. Similarly, the second node transmitter 361 is coupled to a second node-transmitter antenna 366 and the second node receiver 362 is coupled to the second node-receiver antenna 367, and the third node transmitter 371 is coupled to the third node-transmitter antenna 376 and the third node receiver 372 is coupled to the third node-receiver antenna 377. The antennas could be omnidirectional, sectored, or steerable (smart) antennas.

With each node using the node transmitter 351 and the node receiver 352, of FIG. 4, or the plurality of node transmitters 351, 361, 371 and the plurality of node receivers, 352, 362, 372 of FIG. 5, a node communicates with a different node having a node transmitter and node receiver node receiver. Thus, in the plurality of nodes 110, 120, 130, 140, 150, 160, 170 180, 190, the first node 110 communicates with the second node 120, the fourth node 140 and the fifth node 150. The second node 120 communicates with the first node 110, the third node 130, the fourth node 140, the fifth node 150 and the sixth node 160. The third node communicates with the second node 120, the fifth node 150 and the sixth node 160. The fourth node communicates with the first node 110, the second node 120, the fifth node 150, the seventh node 170 and the eighth node 180. The fifth node communicates with the first node 110, the second node 120, the third node 130, the fourth node 140, the sixth node 160, the seventh node 170, the eighth node 180 and the ninth node 190. The sixth node 160 communicates with the second node 120, the third node 130, the fifth node 150, the eighth node 180 and the ninth node 190. The seventh node 170 communicates with the fourth node 140, the fifth node 150 and the eighth node 180. The eighth node 180 communicates with the fourth node 140, the fifth node 150, the sixth node 160, the seventh node 170 and the ninth node 190. The ninth node communicates with the fifth node 150, the sixth node 160 and the eighth node 180.

Each node may include a plurality of spread-spectrum transceivers 310, 320, 330, or, equivalently, a plurality of spread-spectrum transmitters 311, 321, 331 and a plurality of spread-spectrum receivers 312, 322, 332, a store-and-forward subsystem 341, and a flow-control subsystem 340. The flow-control subsystem 340 typically would include a processor or computer. The store-and-forward subsystem 341 typically would include memory and the memory may be part of the computer embodying the processor for the flow-control subsystem 340. The memory may be random access memory (RAM) or hard drive, or other volatile or non-volatile memory and memory storage device. Other devices are well-known in the art, and include hard drives, magnetic tapes, compact disk (CD), and other laser/optical memories and bubble memory devices. The particular flow-control subsystem 340 and the store-and-forward subsystem 341 would be specified by a particular system requirements and design criteria.

Each node in the plurality of nodes 110, 120, 130, 140, 150, 160, 170 180, 190 also includes at least one node transmitter 351, and more typically a plurality of node transmitters 351, 361, 371 and at least one node receiver 352 and more typically a plurality of node receivers 352, 362, 372. The store-and-forward subsystem 341 is coupled to and controlled by the flow-control subsystem 340. The plurality of spread-spectrum transmitters 311, 321, 331, are coupled between a plurality of spread-spectrum antennas 316, 326, 336 and the flow-control subsystem 340. The plurality of spread-spectrum receivers 312, 322, 332 are coupled between a plurality of receiver antennas 317, 327, 337 and the flow-control subsystem 340. FIGS. 2 and 3 show the first node 110 communicating with a first plurality of remote stations 111, 112, 113, 114. The second node 120 communicates with a second plurality of remote stations, with FIGS. 2 and 3 showing a first remote station 121 of the second plurality of remote stations. The third node 130 communicates with a third plurality of remote stations 131, 132 and the fourth node 140, the fifth node 150 and the sixth node 160 communicate with a fourth plurality of remote stations, a fifth plurality of remote stations, and a sixth plurality of remote stations, respectively. FIGS. 2 and 3 show the fourth node 140 communicating with a first remote station 141 of the fourth plurality of remote stations, the fifth node 150 communicating with a first remote station 151 of the fifth plurality of remote stations, and the sixth node 160 communicating with a first remote station 161 of the sixth plurality of remote stations. The seventh node 170 and the eighth node 180 are shown communicating with a seventh plurality of remote stations 171, 172, 173 and an eighth plurality of remote stations 181, 182, respectively. The ninth node 190 communicates with a ninth plurality of remote stations, and FIGS. 2 and 3 show the ninth node 190 communicating with a first remote station 191 of the ninth plurality of remote stations.

Figure 6:
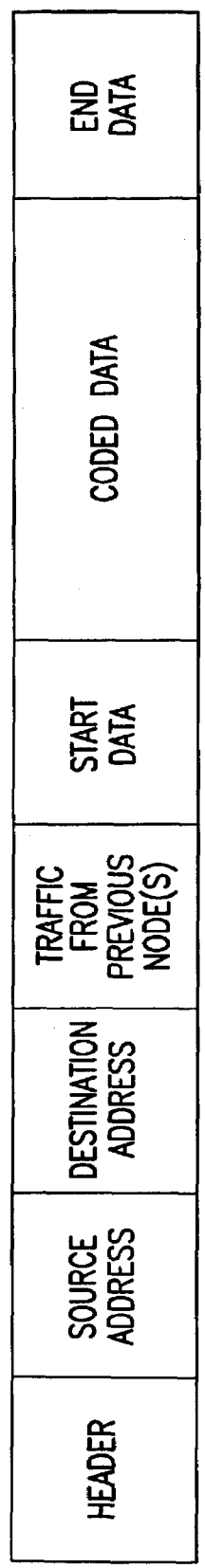
FIG. 6 shows a representative example of a packet.

Each node's spread-spectrum transceiver, or equivalently spread-spectrum transmitter and spread-spectrum receiver, communicates, using packets having spread-spectrum modulation, over radio waves, with the plurality of remote stations. Each packet has a source address and a destination address, and may have header, start of data, end of data, and other information such as flow-control information, forward error correction, and message data. FIG. 6 shows, by way of example, one way a packet may be structured.

The store-and-forward subsystem 341 stores and forwards one or more packets to and from the remote station. The store-and-forward subsystem 341 stores and forwards the one or more packets to and from another node in the plurality of nodes 110, 120, 130, 140, 150, 160, 170 180, 190.

The flow-control subsystem 340 in the distributed network controls the store-and-forward subsystem, to store each packet arriving at the spread-spectrum transceiver. In a preferred embodiment, the flow-control subsystem 340 also is distributed throughout the network, with a flow-control subsystem 340 resident at each node. It is possible, of course, to have a central flow-control system. The flow-control subsystem 340 communicates traffic information between each of the nodes in the plurality of nodes. The traffic information typically includes traffic density at each of the nodes and memory availability. Using the traffic information and in response to a packet having the destination address to the hub node, the flow-control subsystem 340 routes the packet through appropriate nodes to the appropriate hub node. Based on the traffic at each node, and each packet having a destination address to either the hub or a remote station, the flow-control subsystem 340 transmits the packet from the hub node to an appropriate node, and routes the packet to the first recipient node. Each packet may traverse a different route en route to the remote station.

In response to the traffic congestion and to a plurality of packets having voice data, the flow-control subsystem routes the plurality of packets through a path in the plurality of nodes to ensure that the plurality of packets arrive sequentially. The flow control procedure balances the activity in each node relative to other nodes in the distributed network.

When an information packet arrives from a central office, the hub node routes the information packet to an appropriate second recipient node on the way to an intended remote station destination address.

Consider, by way of example, FIG. 3, with calls from the central office 50 to remote stations. There is a set of nodes (hubs) 110, 120 130 who tell the central office 50 of the availability of each hub node 110, 120, 130. By having a set of hub nodes, the central office has redundancy, in case of hub node failure, for sending and receiving packets to and from remote stations. Based on availability of a hub node, a packet is sent to a particular hub node, which is available. If two or more hub nodes are available, any of the available hub nodes can be the recipient of the packet.

Each hub keeps track of the traffic flow, memory availability, of many nodes. The first nodes of which are kept track, include the closest surrounding nodes, as defined by design criteria. The next set of node(s) where the hub keeps information might be the next layer of closest nodes.

When sending a packet from a hub to a remote station, the path routing the packet through various nodes is not known, a priori, except maybe for voice. Typically, a packet is forwarded from the hub to a node, which is on the particular path to the remote user. Nodes chosen for a particular path have available capacity and storage, and can forward the packet to a subsequent node. This ability is called "look ahead".

The packet passes through various nodes, until the packet reaches the remote station. Since the path is not predefined, and not necessarily a direct part "as the crow flies", paths for several packet for the same remote station can be different.

For packets passing from a remote station to the central office 50, the remote station accesses the nearest node. The packet is forwarded, node to node, until the packet arrives at the hub. Paths for packets are not predefined, and can be different for different packets from the remote station to the hub.

For local calls within the distributed network, there is no need for packets going to a hub or central office. Instead, if the data are sent to another remote station located within the distributed network, the packet enters the distributed network through a node near the remote station sending the packet, and exits the distributed network from a node near the recipient remote station. The packet does not travel a predefined path, and different packets from the sending remote station can travel different paths to the recipient remote station. This depends on the destination address as in a phone system.

An advantage of the present invention is that the nodes and the connected remote stations form micro-cells. Thus, low power can be used by the remote stations, and by nodes (base stations), reducing the potential of radio frequency effects on the user of the remote station, such as RF burns, brain tumors, etc. Handoff for a remote station traveling between nodes can be done in any of the standard ways available for packet communications and base stations. One such technique is for the remote station to monitor the control signals from several of the strongest nodes (base stations). When the signal strength from the node (base station) being used by the remote station falls below a threshold, then the remote station transmits the next packet to a node having the largest signal strength being monitored by the remote station.

Each node is small and can be mounted on telephone poles, building, etc. The nodes require little space and low amounts of power.

It will be apparent to those skilled in the art that various modifications can be made to the distributed network, spread-spectrum system of the instant invention without departing from the scope or spirit of the invention, and it is intended that the present invention cover modifications and variations of the distributed network, spread-spectrum system provided they come within the scope of the appended claims and their equivalents.

We claim:

1. A distributed network, spread-spectrum system, comprising:
   a plurality of remote stations;
   a plurality of nodes for covering a geographic area, each node in the plurality of nodes for communicating, with one or more remote stations of the plurality of remote stations, using packets having a destination address and modulated with spread-spectrum modulation, with each packet transmitted using radio waves; and
   a first node within the plurality of nodes for receiving the plurality of packets from the remote station, with the first node capable of communicating a packet to a second node within the plurality of nodes, with the second node selected from two or more nodes capable of communicating with the first node.

2. The distributed network as set forth in claim 1, with the first node using traffic information available at the first node, for selecting the second node.

3. The distributed network, as set forth in claim 1, with said second node for routing the particular packet to a third node in the plurality of nodes.

4. The distributed network as set forth in claim 3, with the second node using traffic information available at the second node, for selecting the third node.

5. The distributed network, as set forth in claim 3, with said third node for routing the particular packet to a fourth node in the plurality of nodes.

6. The distributed network as set forth in claim 5, with the third node using traffic information available at the third node, for selecting the fourth node.

7. The distributed network, as set forth in claim 5, with said fourth node for routing the particular packet to a fifth node in the plurality of nodes.

8. The distributed network as set forth in claim 7, with the fourth node using traffic information available at the fourth node, for selecting the fifth node.

9. The distributed network, as set forth in claim 7, with said fifth node for routing the particular packet to a sixth node in the plurality of nodes.

10. The distributed network as set forth in claim 9, with the fifth node using traffic information available at the fifth node, for selecting the sixth node.

11. The distributed network, as set forth in claim 1, with a first node for routing a particular packet to a second node in the plurality of nodes.

12. The distributed network as set forth in claim 11, with the first node using traffic information, for selecting the second node.

13. The distributed network, as set forth in claim 11, with said second node for routing the particular packet to a third node in the plurality of nodes.

14. The distributed network as set forth in claim 13, with the second node using traffic information for selecting the third node.

15. A distributed network, spread-spectrum system, comprising:
   a plurality of remote stations;
   a plurality of nodes for covering a geographic area, each node in the plurality of nodes for communicating, with one or more remote stations of the plurality of remote stations, using packets having a destination address and modulated with spread-spectrum modulation, with each packet transmitted between a first node and remote station using radio waves; and
   a flow-control system, responsive to the traffic information and to a particular packet, from the first node, with the first node capable of communicating a packet to a second node within the plurality of nodes, with the second node selected from two or more nodes capable of communicating with the first node, the particular packet having a particular destination address of a respective destination node of the plurality of nodes, for selecting a path, including the second node, of a multiplicity of nodes through the plurality of nodes to the destination node, said flow-control system for routing, responsive to the traffic information, the particular packet through the path of the multiplicity of nodes to the respective destination node.

16. The distributed network as set for in claim 15, with said flow-control system including means for communicating with radio waves.

17. The distributed network as set for in claim 15, with said flow-control system including means for communicating with spread-spectrum modulation using radio waves.

18. A distributed network, spread-spectrum method, having a plurality of nodes, comprising the steps of:
   communicating, to a first node of the plurality of nodes, with one or more remote stations of a plurality of remote stations, using packets having a destination address and modulated with spread-spectrum modulation, with each packet transmitted between the first node and remote station using radio waves;

communicating traffic information between the plurality of nodes;

selecting, responsive to the traffic information and to a particular packet, from the first node, having a particular destination address of a respective destination node of the plurality of nodes, a path, including a second node, within the plurality of nodes, with the second node selected from two or more nodes capable of communicating with the first node, of a multiplicity of nodes through the plurality of nodes to the destination node; and routing, responsive to the traffic information, the particular packet through the path of the multiplicity of nodes to the respective destination node.

19. The method as set forth in claim 18, further including the step of using traffic information available at the first node, for selecting the second node.

20. The method as set forth in claim 18, further including the step of routing, from the second node, the particular packet to a third node in the plurality of nodes.

21. The method as set forth in claim 20, further including the step of routing, from the third node, the particular packet to a fourth node in the plurality of nodes.

22. The method as set forth in claim 20, further including the step of using traffic information available at the second node, for selecting the third node.

23. The method as set forth in claim 22, further including the step of using traffic information available at the third node, for selecting the fourth node.

24. The method as set forth in claim 22, further including the step of routing, from the fourth node, the particular packet to a fifth node in the plurality of nodes.

25. The method as set forth in claim 24, further including the step of using traffic information available at the fourth node, for selecting the fifth node.

26. The method as set forth in claim 24, further including the step of routing the particular packet to a sixth node in the plurality of nodes.

27. The method as set forth in claim 26, further including the step of using traffic information available at the fifth node, for selecting the sixth node.

28. The distributed-network, spread-spectrum method as set forth in claim 18, with the routing step including the step of modulating the packet with spread-spectrum modulation.

29. The distributed-network, spread-spectrum method as set forth in claim 18, with the routing step including the step of transmitting, using radio waves, the packet with spread-spectrum modulation.

30. A distributed network, spread-spectrum system, comprising:

a plurality of remote stations;

a plurality of nodes for covering a geographic area, each node in the plurality of nodes for communicating, with one or more remote stations of the plurality of remote stations, using packets having a destination address and modulated with spread-spectrum modulation, with each packet transmitted between a first node and remote station using radio waves; and a central flow-control management system, responsive to the traffic information and to a particular packet, from the first node, having a respective destination address of a respective destination node of the plurality of nodes, for selecting a path, including a second node, within the plurality of nodes, with the second node selected from two or more nodes capable of communicating with the first node, of a multiplicity of nodes through the plurality of nodes to the destination node, said central flow-control management system for routing, responsive to the traffic information, the particular packet through the path of the multiplicity of nodes to the respective destination node.

31. The distributed network as set for in claim 30, with said central flow-control management system including means for communicating with radio waves.

32. The distributed network as set for in claim 30, with said central flow-control management system including means for communicating with spread-spectrum modulation using radio waves.

* * * * *

US007167503C1

(12) EX PARTE REEXAMINATION CERTIFICATE (10291st)

United States Patent
Schilling et al.

(10) Number: US 7,167,503 C1
(45) Certificate Issued: *Sep. 8, 2014

(54) DISTRIBUTED SPREAD-SPECTRUM NETWORK

(75) Inventors: Donald L. Schilling, Palm Beach Gardens, FL (US); Joseph Garodnick, Centerville, MA (US)

(73) Assignee: Linex Technologies, Inc. of DE, West Long Branch, NJ (US)

Reexamination Request:
No. 90/013,001, Sep. 20, 2013

Reexamination Certificate for:
Patent No.: 7,167,503
Issued: Jan. 23, 2007
Appl. No.: 10/298,481
Filed: Nov. 18, 2002

( * ) Notice: This patent is subject to a terminal disclaimer.

Related U.S. Application Data

(63) Continuation of application No. 09/729,911, filed on Dec. 6, 2000, now Pat. No. 6,493,377.

(51) Int. Cl.
*H04B 1/707* (2011.01)
(52) U.S. Cl.
USPC ...................... 375/130; 375/141; 375/E1.001
(58) Field of Classification Search
None
See application file for complete search history.

(56) References Cited

To view the complete listing of prior art documents cited during the proceeding for Reexamination Control Number 90/013,001, please refer to the USPTO's public Patent Application Information Retrieval (PAIR) system under the Display References tab.

*Primary Examiner* — Ovidio Escalante

(57) ABSTRACT

A distributed spread-spectrum network, comprising remote stations and nodes. One or more hub nodes(s) connect(s) to a central telephone office. A node's spread-spectrum transceiver communicates, using packets having spread-spectrum modulation, over radio waves, with the remote stations. Each packet has a source address and a destination address, and may have other information such as a header, start of message, end of message, flow-control information, forward error correction, and message data. A store-and-forward subsystem stores and forwards one or more packets to and from the remote station. The store-and-forward subsystem stores and forwards the one or more packets to and from another node. A flow-control subsystem controls the store-and-forward subsystem, to store each packet arriving at the spread-spectrum transceiver. The flow-control subsystem communicates traffic information between each of the nodes. The flow-control subsystem routes the packet through appropriate nodes to the hub node from a remote station. Based on the traffic at each node, the flow-control subsystem transmits the packet from the hub node to an appropriate node, and routes the packet to a recipient remote station. The flow-control subsystem routes the plurality of packets through a path in the plurality of nodes to ensure that the plurality of packets arrive sequentially for voice or video packets.

At the time of issuance and publication of this certificate, the patent remains subject to pending trial proceeding IPR2014-00595 filed Apr. 8, 2014. The claim content of the patent may be subsequently revised as the result of that proceeding.

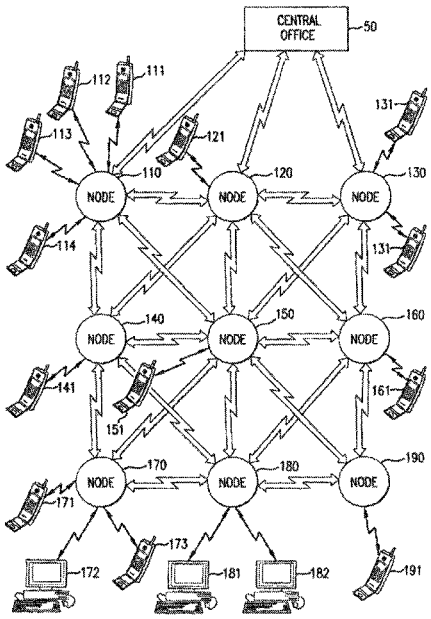

US 7,167,503 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 5, 7, 9, 11, 13, 15 and 18-30 are determined to be patentable as amended.

Claims 2, 4, 6, 8, 10, 12, 14, 16, 17, 31 and 32, dependent on an amended claim, are determined to be patentable.

New claims 33-40 are added and determined to be patentable.

1. A distributed network, spread-spectrum system, comprising:

a plurality of remote stations;

a plurality of *fixed* nodes *forming the distributed network for covering a particular* geographic area, each node in the plurality of *fixed* nodes *including a plurality of transmitters and receivers* for communicating, with one or more remote stations of the plurality of remote stations, using packets having a destination address and modulated with spread-spectrum modulation, with each packet transmitted using radio waves, *each fixed, node covering a micro-cell having a radius less than one mile and including a store-and-forward subsystem and a flow-control sub-system and being capable of communicating with two or more other nodes of the plurality of fixed nodes in the distributed network;*

*the plurality of remote stations being capable of accessing using radio waves, a first node in the distributed network, employing traffic information transmitted by the plurality of fixed nodes, and transmitting packets only to the first node thereby using minimum power;* and

[a] *the* first node within the plurality of *fixed* nodes for receiving the plurality of packets from the remote station, with the first node capable of communicating a packet to a second node within the plurality of nodes, with the second node selected from two or more nodes capable of communicating with the first node.

3. The distributed network, as set forth in claim 1, with said second node for routing the particular packet to a third node in the plurality of *fixed* nodes.

5. The distributed network, as set forth in claim 3, with said third node for routing the particular packet to a fourth node in the plurality of *fixed* nodes.

7. The distributed network, as set forth in claim 5, with said fourth node for routing the particular packet to a fifth node in the plurality of *fixed* nodes.

9. The distributed network, as set forth in claim 7, with said fifth node for routing the particular packet to a sixth node in the plurality of *fixed* nodes.

11. The distributed network, as set forth in claim 1, with [a] *the* first node for routing a particular packet to a second node in the plurality of *fixed* nodes.

13. The distributed network, as set forth in claim 11, with said second node for routing the particular packet to a third node in the plurality of *fixed* nodes.

15. A distributed network, spread-spectrum system, comprising:

a plurality of remote stations;

a plurality of *fixed* nodes *forming the distributed network for covering a particular* geographic area, *each node being mounted on a stationary structure such that each node covers an area having a radius of less than one mile*, each node in the plurality of nodes *including a store and forward subsystem and a plurality of transmitters and receivers* for communicating, with one or more remote stations of the plurality of remote stations *and also with two or more of the nodes*, using packets having a destination address and modulated with spread-spectrum modulation, with each packet transmitted between a first node and remote station using radio waves; [and]

*one or more of the plurality of transmitters at each node transmitting packets from that node to the next node on a path toward the destination of the packet and transmitting traffic information for routing packets;* a flow-control system, responsive to the traffic information and to a particular packet, from the first node, with the first node capable of communicating a packet to a second node within the plurality of *fixed* nodes, with the second node selected from two or more nodes capable of communicating with the first node, the particular packet having a particular destination address of a respective destination node of the plurality of nodes, for selecting a path, including the second node, of a multiplicity of nodes through the plurality of *fixed* nodes to the destination node, said flow-control system for routing, responsive to the traffic information, the particular packet through the path of the multiplicity of nodes to the respective destination node; *and*

*one or more of the plurality of transmitters at each node for transmitting packets from a node to the next node on a path toward the packet's destination, and for transmitting traffic information for routing packets.*

18. A distributed network, spread-spectrum method, having a plurality of *fixed* nodes *forming the distributed network, covering a particular geographic area, each node being mounted on a stationary structure and covering an area having a radius of less than one mile, each node including a store and forward subsystem and a flow control subsystem and including a plurality of transmitters and receivers for communicating packets having a destination address and modulated with spread-spectrum modulation*, comprising the steps of:

communicating, to a first node of the plurality of nodes, with one or more remote stations of a plurality of remote stations, using packets having a destination address and modulated with spread-spectrum modulation, with each packet transmitted between the first node and remote station using radio waves;

*selecting and accessing the first node by a remote station, employing traffic information transmitted by the nodes;* communicating traffic information between the plurality of *fixed* nodes;

selecting, responsive to the traffic information and to a particular packet, from the first node, having a particular destination address of a respective destination node of the plurality of nodes, a path, including a second node, within the plurality of *fixed* nodes, with the second node selected from two or more nodes capable of communicating with the first node, of a multiplicity of nodes through the plurality of *fixed* nodes to the destination node; and routing, responsive to the traffic information, the particular packet through the path of the multiplicity of nodes to the respective destination node, *the routing step employing one or more of the transmitters and receivers at each node and the data from the remote station using one or more of the plurality of transmitters and receivers at each node.*

19. The *distributed network, spread-spectrum* method as set forth in claim 18, further including the step of using traffic information available at the first node, for selecting the second node.

20. The *distributed network, spread-spectrum* method as set forth in claim 18, further including the step of routing, from the second node, the particular packet to a third node in the plurality of *fixed* nodes.

21. The *distributed network, spread-spectrum* method as set forth in claim 20, further including the step of routing, from the third node, the particular packet to a fourth node in the plurality of *fixed* nodes.

22. The *distributed network, spread-spectrum* method as set forth in claim 20, further including the step of using traffic information available at the second node, for selecting the third node.

23. The *distributed network, spread-spectrum* method as set forth in claim 22, further including the step of using traffic information available at the third node, for selecting the fourth node.

24. The *distributed network, spread-spectrum* method as set forth in claim 22, further including the step of routing, from the fourth node, the particular packet to a fifth node in the plurality of *fixed* nodes.

25. The *distributed network, spread-spectrum* method as set forth in claim 24, further including the step of using traffic information available at the fourth node, for selecting the fifth node.

26. The *distributed network, spread-spectrum* method as set forth in claim 24, further including the step of routing the particular packet to a sixth node in the plurality of *fixed* nodes.

27. The *distributed network, spread-spectrum* method as set forth in claim 26, further including the step of using traffic information available at the fifth node, for selecting the sixth node.

28. The [distributed-network] *distributed network*, spread-spectrum method as set forth in claim 18, with the routing step including the step of modulating the packet with spread-spectrum modulation.

29. The [distributed-network] *distributed network*, spread-spectrum method as set forth in claim 18, with the routing step including the step of transmitting, using radio waves, the packet with spread-spectrum modulation.

30. A distributed network, spread-spectrum system, comprising:

a plurality of remote stations;

a plurality of *fixed* nodes *forming the distributed network* for covering a geographic area, each node in the plurality of nodes *covering an area having a radius of less than one mile and* for communicating, with one or more remote stations of the plurality of remote stations, using packets having a destination address and modulated with spread-spectrum modulation, with each packet transmitted between a first node and remote station using radio waves; [and]

*the remote stations each being capable of accessing and communicating packets, with spread spectrum modulation using radio waves, to the first node in the distributed network, employing traffic information transmitted by the nodes, the packets electing and accessing the first node;* a central flow-control management system, responsive to the traffic information and to a particular packet, from the first node, having a respective destination address of a respective destination node of the plurality of nodes, for selecting a path, including a second node, within the plurality of *fixed* nodes, with the second node selected from two or more nodes capable of communicating with the first node, of a multiplicity of nodes through the plurality of nodes to the destination node, said central flow-control management system for routing, responsive to the traffic information, the particular packet through the path of the multiplicity of nodes to the respective destination node; *and*

*a plurality of transceivers at each node for receiving and transmitting packets from the remote stations as well as routing information.*

33. *The distributed network as set forth in claim 1 with the traffic information including relative signal strength.*

34. *The distributed network as set forth in claim 1 with the traffic information including traffic congestion.*

35. *The distributed network as set forth in claim 1 with the traffic information including the strength of control signals from the nodes.*

36. *The distributed network as set forth in claim 30 with said central flow-control management system including congestion control within the distributed network by balancing node activity.*

37. *The distributed network as set forth in claim 30, with said central flow-control management system responsive to failure of nodes within the distributed network.*

38. *The distributed network as set forth in claim 30, with the first node selected based on the strength of the received power of nodes by the remote station.*

39. *The distributed network as set forth in claim 30, with the first node selected based on a particular access packet transmitted by the first node and received by the remote station.*

40. *The distributed network as set forth in claim 15, with said flow-control system including means for congestion control within the distributed network by balancing the packet activity by selecting the path to the subsequent recipient node.*

* * * * *

(12) EX PARTE REEXAMINATION CERTIFICATE (10708th)
United States Patent
Schilling et al.

(10) Number: US 7,167,503 C2
(45) Certificate Issued: *Sep. 10, 2015

(54) DISTRIBUTED SPREAD-SPECTRUM NETWORK

(75) Inventors: Donald L. Schilling, Palm Beach Gardens, FL (US); Joseph Garodnick, Centerville, MA (US)

(73) Assignee: LINEX TECHNOLOGIES, INC., West Long Branch, NJ (US)

Reexamination Request:
No. 90/013,400, Nov. 26, 2014

Reexamination Certificate for:
Patent No.: 7,167,503
Issued: Jan. 23, 2007
Appl. No.: 10/298,481
Filed: Nov. 18, 2002

Reexamination Certificate C1 7,167,503 issued Sep. 8, 2014

(*) Notice: This patent is subject to a terminal disclaimer.

Related U.S. Application Data

(63) Continuation of application No. 09/729,911, filed on Dec. 6, 2000, now Pat. No. 6,493,377.

(51) Int. Cl.
- *H04B 1/707* (2011.01)
- *H04B 1/69* (2011.01)
- *H04L 12/801* (2013.01)

(52) U.S. Cl.
CPC . *H04B 1/69* (2013.01); *H04L 47/14* (2013.01)

(58) Field of Classification Search
None
See application file for complete search history.

(56) References Cited

To view the complete listing of prior art documents cited during the proceeding for Reexamination Control Number 90/013,400, please refer to the USPTO's public Patent Application Information Retrieval (PAIR) system under the Display References tab.

*Primary Examiner* — Minh Dieu Nguyen

(57) ABSTRACT

A distributed spread-spectrum network, comprising remote stations and nodes. One or more hub nodes(s) connect(s) to a central telephone office. A node's spread-spectrum transceiver communicates, using packets having spread-spectrum modulation, over radio waves, with the remote stations. Each packet has a source address and a destination address, and may have other information such as a header, start of message, end of message, flow-control information, forward error correction, and message data. A store-and-forward subsystem stores and forwards one or more packets to and from the remote station. The store-and-forward subsystem stores and forwards the one or more packets to and from another node. A flow-control subsystem controls the store-and-forward subsystem, to store each packet arriving at the spread-spectrum transceiver. The flow-control subsystem communicates traffic information between each of the nodes. The flow-control subsystem routes the packet through appropriate nodes to the hub node from a remote station. Based on the traffic at each node, the flow-control subsystem transmits the packet from the hub node to an appropriate node, and routes the packet to a recipient remote station. The flow-control subsystem routes the plurality of packets through a path in the plurality of nodes to ensure that the plurality of packets arrive sequentially for voice or video packets.

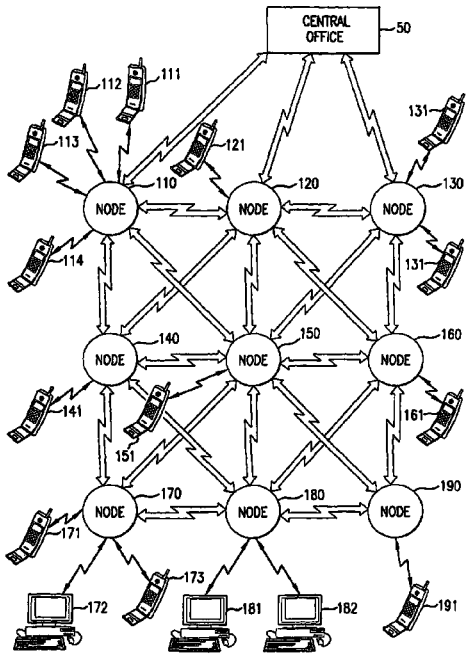

EX PARTE
REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-40 is confirmed.

\* \* \* \* \*